US009350558B2

(12) United States Patent
Ghanwani et al.

(10) Patent No.: US 9,350,558 B2
(45) Date of Patent: May 24, 2016

(54) SYSTEMS AND METHODS FOR PROVIDING MULTICAST ROUTING IN AN OVERLAY NETWORK

(71) Applicant: Dell Products L.P., Round Rock, TX (US)

(72) Inventors: Anoop Ghanwani, Rocklin, CA (US); Krishnamurthy Subramanian, Mountain View, CA (US); Mohnish Anumala, Cupertino, CA (US); Shivakumar Sundaram, Tamilnadu (IN); Pathangi Janardhanan, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 227 days.

(21) Appl. No.: 13/737,919

(22) Filed: Jan. 9, 2013

(65) Prior Publication Data

US 2014/0192804 A1    Jul. 10, 2014

(51) Int. Cl.
*H04L 12/28*     (2006.01)
*H04L 12/18*     (2006.01)
*G06F 9/455*     (2006.01)
*H04L 12/931*    (2013.01)
*H04L 12/755*    (2013.01)
*G06F 9/50*      (2006.01)
*H04L 29/12*     (2006.01)

(52) U.S. Cl.
CPC ............ *H04L 12/18* (2013.01); *G06F 9/45558* (2013.01); *H04L 49/201* (2013.01); *H04L 49/70* (2013.01); *G06F 9/5072* (2013.01); *G06F 2009/45595* (2013.01); *H04L 12/185* (2013.01); *H04L 45/021* (2013.01); *H04L 61/103* (2013.01)

(58) Field of Classification Search
CPC . H04L 12/467; H04L 12/4645; H04L 12/185; H04L 51/12; G06F 15/177; G06F 2221/2141; G06F 9/45533; G06F 9/45558; G06F 2009/45595; G06F 21/62
USPC .......................... 370/235, 329, 351, 389, 392
See application file for complete search history.

(56) References Cited

U.S. PATENT DOCUMENTS 7,983,257 B2 *   7/2011   Chavan et al. ................ 370/389
8,009,682 B2 *   8/2011   Gopinath et al. ............. 370/401

(Continued)

OTHER PUBLICATIONS

Narten et al., "Problem Statement: Overlays for Network Virtualization", Draft 4, Internet-Draft, Internet Engineering Task Force, Aug. 10, 2012 (last retrieved on Jan. 9, 2013 from http://tools.ietf.org/html/draft-narten-nvo3-overlay-problem-statement-04).

*Primary Examiner* — Brian O'Connor
(74) *Attorney, Agent, or Firm* — Haynes & Boone, LLP

(57) ABSTRACT

An information handling system is provided. The information handling system includes a first hypervisor running on a first host and a second hypervisor running on a second host. The first hypervisor managing a first virtual switch, and the second hypervisor managing a second virtual switch. The information handling system also includes a plurality of virtual machines (VMs), including a first VM, which is part of a first tenant, running on the first host, and a second VM, part of a second tenant, running on the second host. The first virtual switch has a mapping in memory that maps a customer-specific multicast IP address, used by the plurality of VMs to indicate a multicast group that includes VMs on the first and second tenants, to a global multicast IP address used by the first and second hosts.

20 Claims, 7 Drawing Sheets

(56) References Cited

U.S. PATENT DOCUMENTS

| | | | |
|---|---|---|---|
| 8,238,337 B1 * | 8/2012 | Orr et al. | 370/390 |
| 8,289,960 B2 * | 10/2012 | Raja et al. | 370/389 |
| 8,369,333 B2 * | 2/2013 | Hao et al. | 370/392 |
| 8,417,800 B2 * | 4/2013 | Shah et al. | 709/220 |
| 8,612,576 B1 * | 12/2013 | Brandwine et al. | 709/224 |
| 8,738,745 B1 * | 5/2014 | Brandwine et al. | 709/220 |
| 8,831,000 B2 * | 9/2014 | Mishra et al. | 370/390 |
| 8,892,706 B1 * | 11/2014 | Dalal | 709/223 |
| 8,913,611 B2 * | 12/2014 | Koponen et al. | 370/389 |
| 8,953,618 B2 * | 2/2015 | Mishra et al. | 370/395.7 |
| 2013/0343385 A1 * | 12/2013 | Benny et al. | 370/392 |

* cited by examiner

SYSTEMS AND METHODS FOR PROVIDING MULTICAST ROUTING IN AN OVERLAY NETWORK

BACKGROUND

1. Technical Field

The present disclosure is related to information handling systems. In particular, embodiments disclosed herein are related to multicast routing in a virtualized network environment.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, information handling systems are being developed that seek to leverage underlying hardware to support a wide variety of virtual components to create highly manipulable, configurable virtual networks. These information handling systems seek to use large numbers of virtual machines running on hypervisors that, in turn, may run on physical hardware. Virtual local area networks (VLANs) may be used to separate tenants in such networks. In some instances, the VLAN may be required to stretch across the data center to provide access to certain services. Additionally, some data center customers may need very large numbers of virtual machines.

However, there are several issues with using that approach such as the number of tenants, the requirements for the network to support a large number of MAC addresses (one per VM), and challenges with transporting the traffic over routed infrastructure. Additionally, managing large VLANs in such environments can be difficult. To address these issues, a new technology, referred to as network virtualization over layer 3 (NVO3) has emerged. In networks using NVO3, what used to be a VLAN in the physical network is now referred to as a tenant. However, currently available implementations have not been entirely satisfactory.

SUMMARY

Consistent with some embodiments, there is provided an information handling system. The information handling system includes a first hypervisor running on a first host, the first hypervisor managing a first virtual switch running on the first host, and a second hypervisor running on a second host, the second hypervisor managing a second virtual switch running on a second host. A plurality of virtual machines (VMs) are running on the first and second hosts, managed by the second and second hypervisors, respectively. This plurality of VMs includes a first VM running on the first host, the first VM being part of a first tenant, and a second VM running on the second host, the second VM being part of a second tenant, where both the first and second tenant belong to a single customer. The first virtual switch has a mapping in memory that maps a customer-specific multicast IP address, used by the plurality of VMs to indicate a multicast group, to a global multicast IP address used by the first and second hosts. The multicast group includes VMs in the first and the second tenants.

Consistent with some embodiments, there is further provided a method for providing multicast addressing in an overlay network. The method includes steps of sending a packet from a first VM of a plurality of VMs on a host and receiving the packet at a virtual switch on the host in communication with the first VM. The packet includes a customer-specific multicast IP address of a multicast group that includes a plurality of VMs in one or more tenants belonging to a customer. The method further includes encapsulating the packet with a global multicast IP address of the multicast group corresponding to a plurality of hosts on which the plurality of VMs are running and transmitting the encapsulated packet with the global multicast IP address as a destination address.

Consistent with some embodiments, there is further provided a method for providing multicast addressing in an overlay network. The method includes steps of receiving a packet from a first VM on a first host at a virtual switch on a second host, recognizing a global multicast IP address in a header of the packet, and mapping the global multicast IP address to a customer-specific multicast IP address. Additionally, the virtual switch determines which VMs of a plurality of VMs on the second host are member VMs of a multicast group identified locally by the customer-specific multicast IP address, and sends a copy of the packet to each member VM on the second hypervisor. The virtual switch edits the VLAN identifier to match the VLAN identifiers of each of the destination VMs if needed.

These and other embodiments will be described in further detail below with respect to the following figures.

Figure 1:
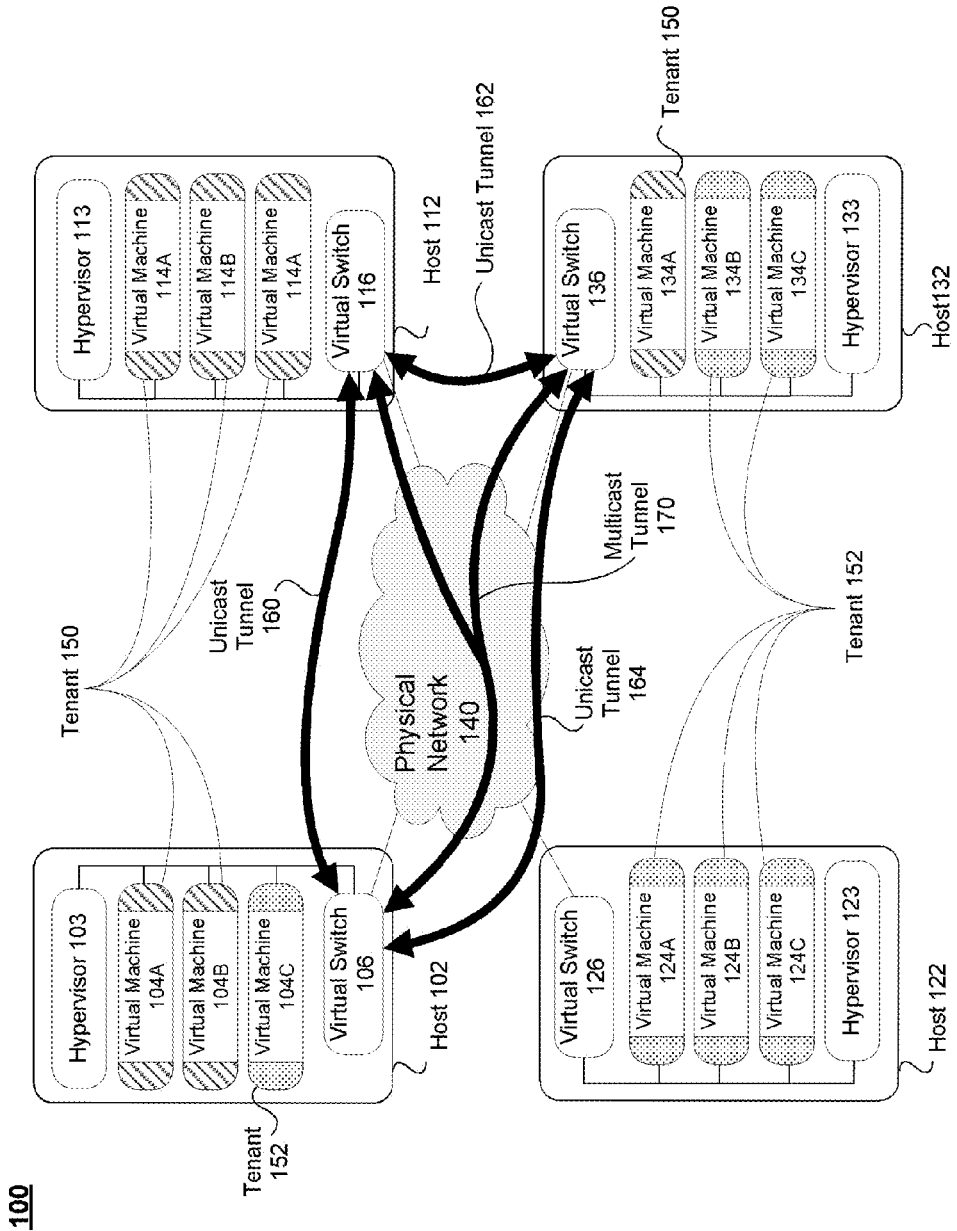
FIG. 1 is a high-level diagram that illustrates an overlay network that includes a number of hypervisors communicating through a physical network.

For clarity of discussion, elements having the same designation in the drawings may have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 depicts an information handling system 100 that includes an overlay network running over top of an underlying physical network 140. Coupled to the physical network (and forming part of the physical network) is a plurality of hosts or servers, with hosts 102, 112, 122, and 132 being depicted. The host or server hardware includes one or more processors, memory, network interface cards, and other features as will be apparent to one of skill in the art. The overlay network has a plurality of virtual switches, including virtual switches 106, 116, 126, and 136 that are managed by hypervisors 103, 113, 123, and 133, respectively. Each of these hypervisors may be a software program running on a server or host hardware 102, 112, 122, and 132 respectively, in the underlying physical network 140, which may also include layer 2 and layer 3 devices, such as top-of-rack switches, aggregation switches, and others. Each hypervisor may be running directly on its respective host in physical network 140 or may be running on an operation system that is running on the hardware.

Hypervisors 103, 113, 123, and 133 may have several features in common that may be explained by reference to one of these hypervisors. Hypervisor 103 supports and manages a plurality of virtual machines (VMs), depicted as a VM 104A, a VM 104B, and a VM 104C. Each virtual machine is a software implementation running on host 102. In some embodiments, all or some of the VMs may be instances of full operating systems. While in other embodiments, all or some of the VMs may be instances of a single program.

Also running on host 102 is a virtual switch 106, managed by hypervisor 103, that may act as a Layer-2 switch for the exchange of data, in packet form, to, from, and among VMs 104A, 104B, and 104C. Virtual switch 106 may also act as a Layer-2 switch to interface between VMs on hosts 102, 112, 122, and 132. Thus, virtual switch 106 may be configured to add, remove, and/or modify headers as needed for the desired transmission of packets. Virtual switch 106 may be a software implementation managed by hypervisor 103. However, in some embodiments, some or all of the functions of virtual switch 106 are performed by a hardware switch in communication with host 102. For example, when using Virtual Edge Port Aggregators (IEEE 802.1 Qbg), all traffic is sent to an external, hardware switch which performs the functions of a virtual switch. As another example, when a non-virtualized host needs to communicate with the overlay network, a hardware switch can perform the functions of the overlay encapsulation and decapsulation just as a virtual switch would.

Virtual switches 112, 122, and 132 share the features described above in connection with virtual switch 102. Thus, VMs 114A, 114B, and 114C, and a virtual switch 116 may be running on host 112, managed by hypervisor 113. VMs 124A, 124B, and 124C and a virtual switch 126 may be running on host 122. And VMs 134A, 134B, and 134C and a virtual switch 136 may be running on host 132. These VMs and virtual switches may also have the features described above.

Virtual local area networks (VLANs) may be used to group and facilitate communication between certain VMs and may be used to facilitate the live movement of VMs from one host in the physical network to another and other functions and services. In an overlay network such as that seen in information handling system 100, a tenant, identified by a tenant identifier, may correspond to a VLAN. Generally, a single tenant represents a single VLAN.

In information handling system 100, virtual switches 106, 116, and 136 provide a number of tunnels that allow for communication within tenant 150 and between hosts 102, 112, and 132. These tunnels may be Internet Protocol (IP) based tunnels that function by encapsulation. For example, VM 104A on host 102 may need to transmit a packet to VM 114A on host 112. VM 104A sends the packet to virtual switch 106, which then encapsulates the packet with an overlay header that may be used to indicate the tenant to which the packet belongs, an outer IP header, and an outer MAC header for transmission over the physical network 140 to virtual switch 116, which then decapsulates the packet. The decapsulated packet is sent from virtual switch 116 to VM 114A. The encapsulation may effectively provide a unicast tunnel 160 that allows communication between member VMs of tenant 150 on hosts 112 and 102. In some embodiments, encapsulation and decapsulation are provided by the virtual switches. In general, these functions are provided by a network virtualization edge (NVE), which is provided by the virtual switches in this embodiment, but may also be provided by physical switches, such as top-of-rack switches.

Similarly, unicast tunnel 162 provides for communication between the VMs on host 112 and VM 134A on host 132, and unicast tunnel 164 provides for communication between tenant 150 VMs on hosts 102 and 132. Unicast tunnels 162 and 164 may permit intra-tenant and inter-tenant communication. Further, information handling system 100 includes a multicast tunnel 170 through which packets from tenant 150 VMs can reach all the members. Multicast tunnel 170 may be implemented by encapsulating the packet with an overlay header, an IP header with a multicast destination IP address, and an outer MAC header. The MAC address may correspond to the destination IP address using normal IP multicast to MAC address mapping rules. The forwarding of such packets may be done using the PIM protocol which is a control protocol that sets up the forwarding path to forward a given multicast IP address, which appears as the IP destination address in a packet's encapsulation.

In general, large numbers of VMs may be difficult to maintain because the number of address resolution protocol (ARP) or neighbor discovery (ND) packets increases with the number of VMs in a single VLAN. Subnetting may be used to reduce the volume of ARP/ND packets. Typically, a subnet at layer 3 corresponds to a VLAN at layer 2 and corresponds to a tenant in the overlay network. For each subnet or VLAN represented by a tenant, there is an assigned tenant identifier. Information handling system 100 has a tenant 150 that includes VMs 104A and 104B on host 102, VMs 114A, 114B, and 114C on host 112, and VM 134A on host 132. Information handling system also has a second tenant, tenant 152, that includes VMs on hosts 102, 122, and 132. Each tenant in information handling system 100 has a tenant identifier or tenant ID. Thus, in some embodiments described herein, tenants 150 and 152 may be referred to as tenant ID 150 and tenant ID 152, respectively.

These tenants 150 and 152 may be used to provide a service in which an owner/operator of network 140 provides hosting services in the data center to a customer. In such an instance, tenant 150 may be provided to one customer, while tenant 152 is provided to another customer. Expectations and security and privacy may require the separation of the two tenants. For example, security gateways may be provided as a means for one tenant's traffic to be exposed to another tenant's while maintaining security and privacy.

If a single customer's needs include more than a few hundred VMs, this number of VMs may be too large to manage effectively in a single subnet. For example, a single customer that operates a consumer "cloud" service may need a thousand or more VMs in the data center to meets the services' demands. In such an instance, in order to make the system manageable, multiple tenant identifiers may be assigned to the single customer. Thus, in some embodiments, tenant 150 and tenant 152 may be provided to a single customer that has been assigned multiple identifiers (e.g. 150 and 152) in order to minimize the administrative traffic associated with the customer. This customer may also have a multicast tenant identifier assigned to it, the multicast tenant identifier assigned to it for the purpose of delivering multicast routed traffic within the customer's other assigned tenant identifiers.

Figure 2:
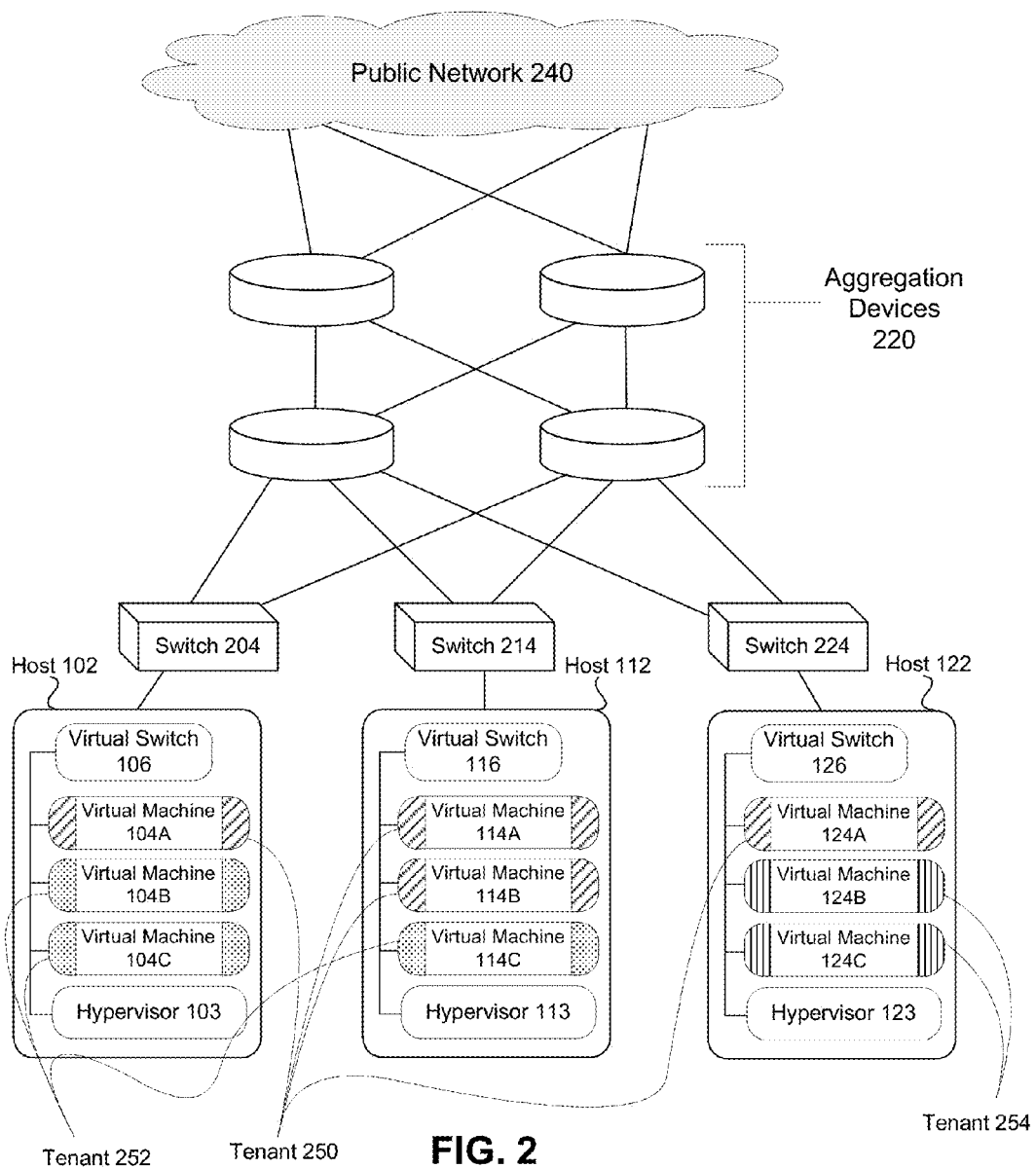
FIG. 2 is a diagram of an information handling system that includes an overlay network and provides more detail regarding the underlying physical network.

FIG. 2 is a diagram of an information handling system 200, which is similar in many respects to information handling system 100 of FIG. 1. Information handling system 200 includes a plurality of hosts each with a plurality of virtual machines and hypervisors. Thus, in the depicted embodiment, information handling system 200 includes a host 102, with VMs 104A, 104B, and 104C and a hypervisor 103; a host 112 with VMs 114A, 114B, and 114C and a hypervisor 113; and a host 122 with VMs 124A, 124B, and 124C and a hypervisor 123. Each of the hosts 102, 112, and 122 may include a virtual switch 106, 116, and 126 respectively, that provides the NVE functions to the system. In the depicted embodiments, virtual switches 106, 116, and 126 are software-based switches, but in other embodiments hardware-based switches may be used.

As depicted, hypervisors 103, 113, and 123 are running directly on their respective hosts. In other embodiments, hypervisors 103, 113, and 123 may be running on top of an operating system that is running on each of the respective hosts. Hosts 102, 112, and 122 are connected to a switch 204, a switch 214, and a switch 224, respectively. In the depicted embodiment, switches 204, 214, and 224 are top-of-rack switches connected to a plurality of aggregation devices 220. Aggregation devices 220 may be layer 2 or layer 3 devices that allow packets to be transmitted/routed between switches 204, 214, and 224 and also allow hosts 102, 112, and 122 to send and receive packets to and from public network 240 through a gateway. In the depicted embodiment, the public network 240 is the Internet.

As depicted, each of the virtual switches 106, 116, and 126 is connected to the public network 240 through a physical network that includes switches 204, 214, and 224 and aggregation devices 220. Given, that the virtual switches 106, 116, and 126 are running on hardware that is physically connected to and/or part of network 140, certain data transmissions are conducted through the physical network. Specifically, data exchanges that occur from a VM on one hypervisor to another VM on a different hypervisor may be conducted through switches 204, 214, and 224 and/or aggregation devices 220.

Information handling system 200 may support virtualization technologies such as Virtual Extensible Local Area Network (VXLAN) or Network Virtualization using Generic Routing Encapsulation (NVGRE) in order to provide tunnels such as those seen in FIG. 1 using the switches and aggregation devices. These protocols and others have been developed to allow for the decoupling the overlay network from the underlying physical network's design and may be used in routing packets from virtual switch to virtual switch by using a tunnel encapsulation.

Figure 3:
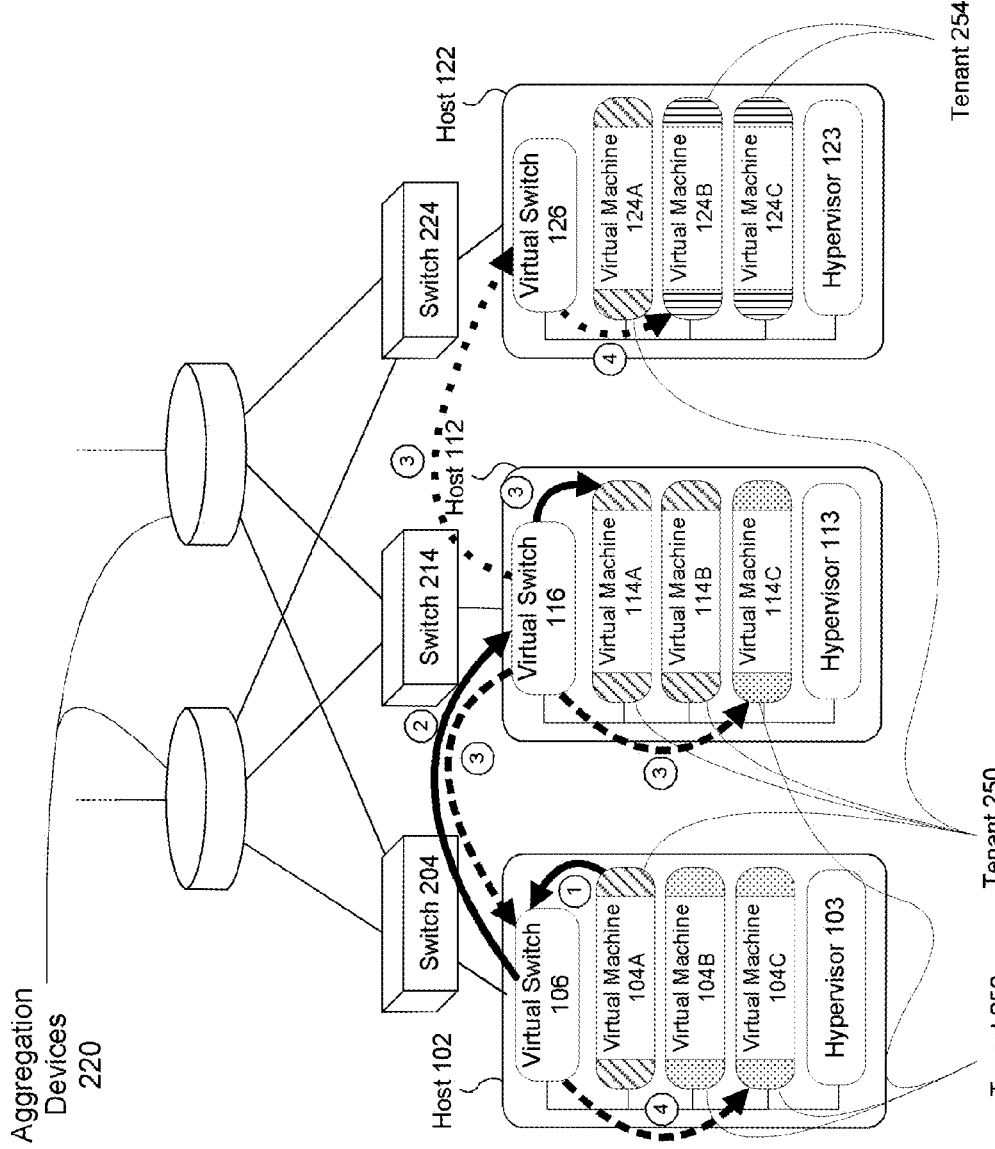
FIG. 3 is a diagram of an information handling system including an example of multicast routing among virtual machines.

FIG. 3 is a diagram of an information handling system 300 in which a multicast packet is sent from VM 104A. First, VM 104A may transmit the packet to virtual switch 106. VM 104A is depicted as part of tenant ID 250. In this embodiment, one virtual switch, virtual switch 116, is designated as a forwarder for a multicast group that includes at least one VM on each of hypervisors 103, 113, and 123. Virtual switch may handle multicast routing for the multicast group. This may be done as illustrated in FIG. 3.

First, VM 104A may send a packet to virtual switch 106. Second, virtual switch 106 may recognize a multicast IP address in a header of the packet sent by VM 104A and may encapsulate the multicast packet for transmission through a multicast tunnel corresponding to the source tenant ID to the designated forwarder on behalf of that tenant ID. Virtual switch 116 may recognize the packet as a multicast packet and serve as a router for the packets. Virtual switch 116 may determine that the destination of the multicast packet includes VMs 114A and 114C on the local host 112, VM 104C on host 102, and VM 124B on host 122. These four VMs are found in three different tenants. VMs 104C and 114C are part of tenant 252, VM 114A is part of tenant 250, and VM 124B is part of tenant 254.

Third, virtual switch 116 may decapsulate and copy the packet and send a copy to the local VMs (those on host 112) included in the multicast destination: VM 114A of tenant 250 and VM 114C of tenant 252. These packets may be sent without encapsulation. However, sending the packet to VMs 104C and 124B may require encapsulation by virtual switch 116 before transmission through the physical network. The encapsulation may provide an appropriate identifier in order to change between tenants. For example, the encapsulation of the copy of the packet sent to virtual switch 126 may include an identifier of tenant 254, since the packet is to be sent to VM 124B, a member of tenant 254. Fourth, the packet for VM 124B may be sent through a tunnel to virtual switch 126, which may decapsulate the packet before sending it to VM 124B. Virtual switch 116 may also encapsulate the packet for transmission through a tunnel back to virtual switch 106, which may then decapsulate the packet and transmit it to VM 104C. In this way, virtual switch 116 may act as a designated forwarder of the multicast group.

Figure 4:
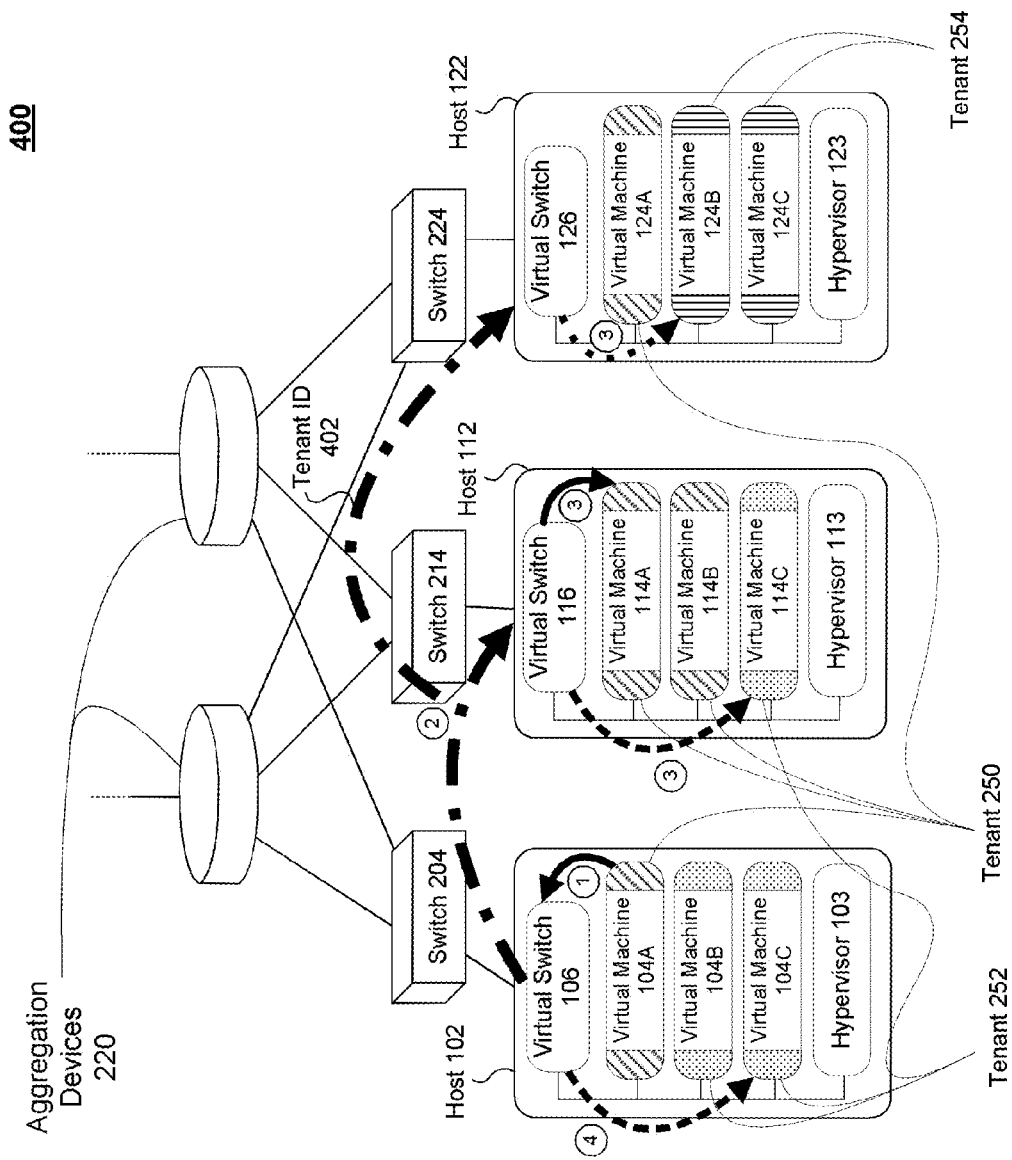
FIG. 4 is a diagram of an information handling system including an example of multicast routing among virtual machines according to an embodiment.

FIG. 4 includes an information handling system 400, which in many respects is similar to information handling system 300 of FIG. 3, with three hypervisors, each having a virtual switch and a plurality of VMs. Rather than having one of the virtual switches acting as designated forwarder for a multicast group, information handling system 400 includes a tenant ID 402 reserved for multicast routing for a multicast group used by the customer that includes VMs in tenants 250, 252, and 254. Tenant ID 402 may be received from a network orchestrator such as VMWARE® VCENTER™ Server or VCLOUD™ DIRECTOR, MICROSOFT® SYSTEM CENTER VIRTUAL MACHINE MANAGER™ (SCVMM), or another suitable orchestration platform.

A request may be made to the network orchestrator to provide a unique multicast IP address to be associated with the customer-specific multicast address. This unique multicast group may be a global multicast IP address for use within the physical network. The network orchestrator may ensure the uniqueness of any requested multicast IP address used by switches 204, 214, 224, and aggregation devices 220, so that no two customers are assigned the same global multicast IP address. Thus, in the depicted embodiment, the requested multicast IP address may be a global multicast tenant group address with respect to the physical network (hosts, switches, and aggregation devices) that underlies the VMs and tenant ID 402. In some embodiments, rather than assigning a new global address for each customer-specific multicast IP address, a global address may be assigned for each set of hosts that need to receive the packet. In such embodiments, the tenant ID and customer-specific multicast IP address may be used to determine to which VMs to forward the packet once it has been delivered to a destination virtual switch.

In the depicted embodiment, multicast packets sent from the various member VMs are sent through aggregation devices 220 and/or switches 204, 214, and 224, using the global multicast IP address included as the outer IP destination address in the tunneled packet. For example, when virtual switch 106 receives multicast packets to be sent using tenant ID 402, virtual switch 106 sends the packets using the global multicast IP address in an encapsulation or overlay header of the packets. The header may also include a tenant identifier such as tenant ID 402.

However, multicast packets, as sent by the member VMs to their associated virtual switches, may not use the global multicast IP address. The VMs may not be aware of the unique global multicast IP address received from the network orchestrator. In the depicted embodiment, the member VMs on a host may use a customer-specific multicast IP address that is unique only within that customer's environment and considered local to the customer's environment. For example, VMs 104A, 104B, and 104C, all being used by a single customer, use a customer-specific multicast IP address. When a packet is sent to virtual switch 106 that includes the multicast IP address as the IP destination address, virtual switch 106 may map the customer-specific multicast IP address associated with tenant 250 to tenant ID 402 with the corresponding global multicast IP address. Virtual switch 106 then encapsulates the packet with the global multicast IP address to send the packet through the physical network to its destinations.

While the global multicast IP address associated with tenant ID 402 may be unique with the physical network, the associated customer-specific multicast IP address used by VMs 104A, 104B, and 104C on hypervisor 103 may be the same as the associated local multicast IP address used by VMs 114A, 114B, and 114C, if these VMs are part of the same customer. Since the customer-specific multicast IP addresses may be used within the context of a group of tenants being used by a single customer, the duplicate use of the customer-specific multicast IP address may not cause conflicts in information handling system 400.

Hypervisors 103, 113, and 123 may be aware of the services available to them by communication with the network orchestrator. Such services may include the multicast groups present in the physical network. The VMs may learn of the available multicast services by services or functions such as multicast registry. Thus, VM 104A may learn of the existence of a multicast group represented by the customer-specific multicast IP address that it can join. If VM 104A wants to join the available multicast group, it may send a join request, such as an Internet Group Management Protocol (IGMP) join request. The join request may be trapped by virtual switch 106. While not the case in the depicted embodiment, VMs 104B and 104C may also send IGMP join requests that are trapped by virtual switch 106. Virtual switch 106 may accumulate all of the IGMP join requests for a multicast group on host 102. This may occur in the control plane of the virtual switch 106. After the accumulation, virtual switch 106 may then send a single IGMP join request, requesting that host 102 join the group corresponding to the global multicast IP address to which the customer-specific IP multicast address maps. The joins may be (*,G) or (s,G) joins. Additionally, a join mechanism other than IGMP may also be used in some embodiments.

When the IGMP join is received from the VM 104A, virtual switch 106 may communicate with the network orchestrator in order to receive information including the global multicast IP address and tenant ID 402 related to the customer's multicast group or groups. In some embodiments, the network orchestrator pushes this information to all hypervisors that participate in the customer so that it is available at the time the join is received.

In order for a VM to participate in the group corresponding to the customer-specific IP multicast address, the virtual switch that the VM is connected to may join tenant ID 402 by joining the group corresponding to the global multicast IP address. For example, if VM 124A is to participate in the group identified by a customer-specific multicast group, which in turn maps to the global multicast IP address and tenant ID 402, virtual switch 126 may join the group corresponding to the global multicast IP address. This may be the case even if VMs 124B and 124C do not participate in the multicast group. VMs may join in order to receive packets from or send packets to the group corresponding to the customer-specific multicast IP address. A given customer may have more than one multicast application and thus may require multiple customer-specific multicast addresses.

FIG. 4 illustrates an example of how a packet may be sent according the aspects of information handling system 400 as described above. First, VM 104A sends a multicast packet to virtual switch 106. Virtual switch 106 recognizes an IP destination address in the packet header as the customer-specific multicast IP address associated with tenant ID 402. The packet header may also include a media access control (MAC) address for the customer-specific multicast IP address. Virtual switch 106 determines that the customer-specific multicast IP address maps to a global multicast IP address that exists outside the management of hypervisor 103 on host 102 in the physical network. Second, in order to transmit the multicast packet to VMs on hosts 112 and 122, virtual switch 106 encapsulates the packet with a header that includes an overlay header containing the tenant ID 402 (the tenant identifier associated with the multicast tenant group), an outer IP header containing the global multicast IP address, and an outer MAC header. The packet is then sent through the tunnel indicated by tenant ID 402 in FIG. 4, to virtual switches 116 and 126. This tunnel is a representation of the virtual switches that have requested to join the group corresponding to the global multicast IP address on behalf of the VMs they are hosting.

Third, virtual switches 116 and 126 recognize the global multicast IP address and the tenant ID 402 contained in the packets' headers and determine which of the VMs have joined the customer-specific multicast IP address which is associated with the global multicast IP address and the tenant ID 402. In this example, these VMs are VMs 114A and 114C on host 112 and VM 124B on host 122. Virtual switch 116 decapsulates the packet and transmits it to VM 114A of tenant 250 and VM 114C of tenant 252, while virtual switch 126 decapsulates the packet and transmits it to VM 124B, which is part of tenant 254. In cases in which these VMs expect to receive VLAN tagged traffic, the tag corresponding to the tenant ID of the VM may be edited into the MAC header of the frame before delivery to the VM. In this way VMs from multiple tenants may be part of a multicast group, which would be require if they were in different subnets.

Figure 5:
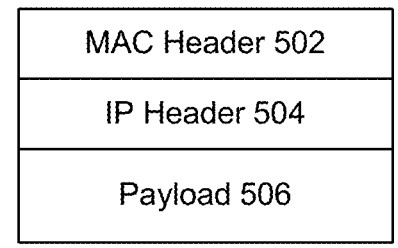
FIG. 5 is a flowchart of a method for providing for the transmission of multicast packets in an overlay network.
Figure 5:
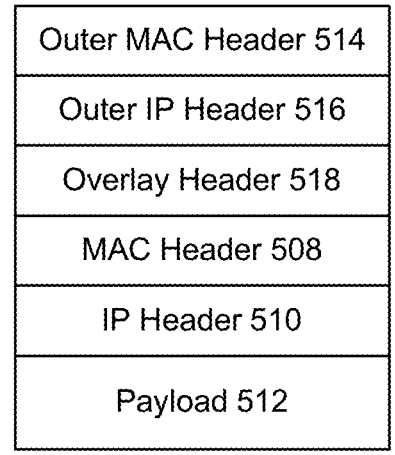
Figure 5:
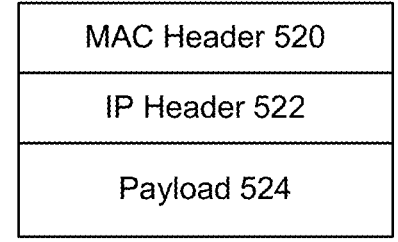

FIG. 5 is a diagram of exemplary packets at certain points in information handling system 400 as seen in FIG. 4. Packet 500A depicts a representative packet as sent from a virtual machine to a virtual switch. For example, packet 500A may be a packet as sent from VM 104A to virtual switch 106 on host 102 of FIG. 4. Packet 500A includes a MAC header 502, which may include a destination MAC address and a source MAC address. The destination MAC address may be a customer-specific multicast MAC address, while the source MAC address may be a MAC address of the sending VM. Packet 500A also includes an IP header 504 that includes a customer-specific IP multicast address as its destination IP address and an IP address of the sending VM as its source address. As depicted, packet 500A further includes a payload 506 containing data to be transmitted. The MAC header may also include a VLAN tag containing a VLAN ID which identifies the tenant.

Packet 500B depicts a representative packet as may be sent from a virtual switch into the physical network. For example, packet 500B may be transmitted from virtual switch 106 through the switches 204, 214, 224, and/or aggregation devices 220 of FIG. 4 to virtual switches 116 and 126. In addition to an inner MAC header 508 (which may be the same as MAC header 502, where the VLAN ID may be removed, having been mapped to a tenant ID in the overlay header), an inner IP header 510 (which may be the same as IP header 504), and a payload 512 (which may be the same as payload 512). Packet 500B also includes an outer MAC header 514 that has a global multicast MAC address as its destination address and a MAC address of the sending virtual switch as its source MAC address. In some embodiments, the outer MAC header 514 may change at each router in the physical network. Packet 500B further includes an outer IP header 516 and an overlay header 518. The outer IP header 516 includes a global multicast IP address as a destination address and an IP address of the sending virtual switch as the source IP address. The overlay header 518 includes a tenant identifier, such as tenant ID 402.

Packet 500C depicts a packet as it moves from a virtual switch to a VM. For example, packet 500C may be a packet as send from virtual switch 116 to virtual machine 114A on host 112. Packet 500C includes a MAC header 520, an IP header 522, and a payload 524. The MAC header 520 includes a customer-specific multicast MAC address as the destination MAC address and a MAC address of the sending virtual switch as the source MAC address. Further, the MAC header may include a VLAN tag containing a VLAN ID that matches the destination tenant. The IP header may include a customer-specific multicast IP address as its destination address and the IP address associated with the sending VM as mentioned above in connection with packet 500A.

Packets 500A, 500B, and 500C may be VLAN tagged packets. In embodiments where the packets are VLAN tagged, the MAC header 502 of Packet 500A may include a VLAN identifier that corresponds to the tenant ID of the sending VM. Similarly, in packet 500C, the MAC header 520 may include a VLAN identifier that corresponds to the tenant ID of the receiving VM. Packets 500A, 500B, and 500C are exemplary packets, depicting headers at certain points in the transmission paths depicted in FIG. 4, and should not be considered as limiting the disclosure to the depicted embodiments only.

Figure 6:
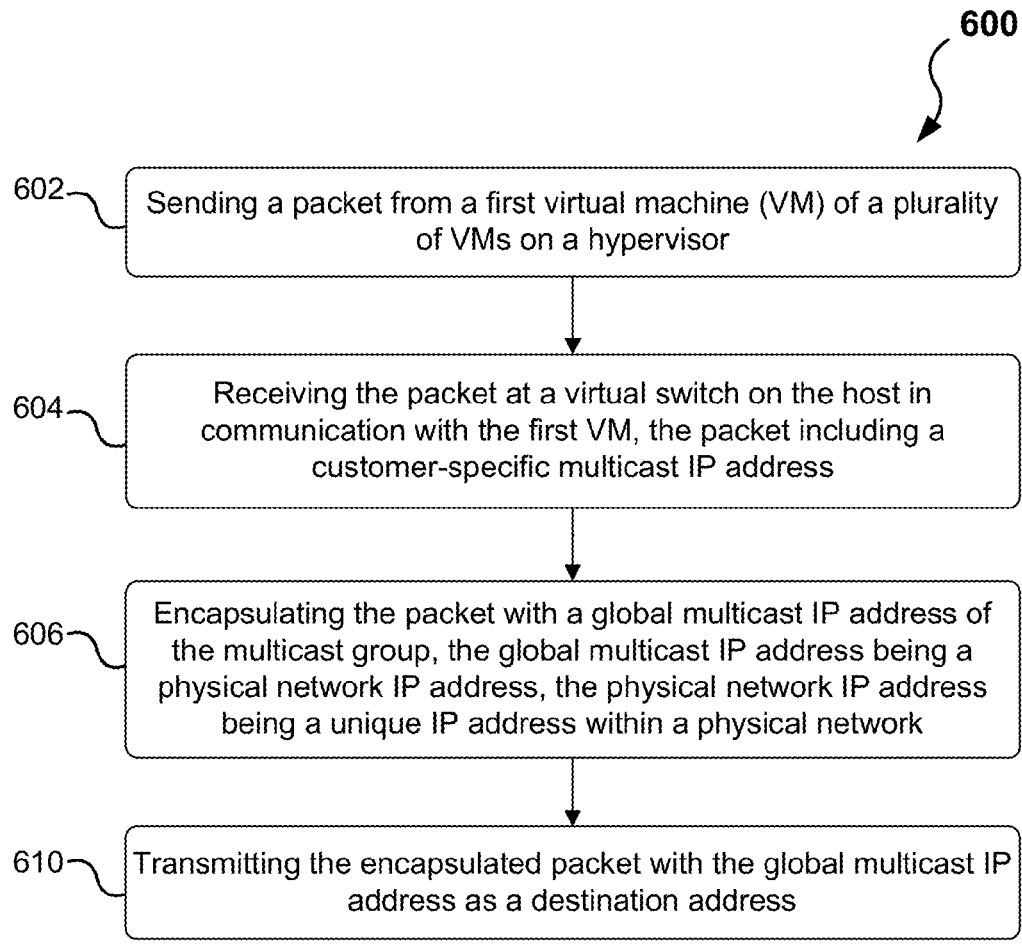
FIG. 6 is a flowchart of a method for providing for the reception of multicast packets in an overlay network.

FIG. 6 is a flowchart of a method 600 for facilitating multicast routing in an overlay network as described above. Method 600 may begin when a VM of a plurality of VMs on a hypervisor sends a multicast packet, in step 602. In step 604, a virtual switch on the hypervisor may receive the packet from the first VM. The packet may include a customer-specific multicast IP address corresponding to a customer-specific multicast group. In step 606, the virtual switch may encapsulate the packet with a global multicast IP address corresponding to the customer-specific multicast IP address and with a tenant identifier used for at least some of the customer's multicast transmissions. And in step 610, the virtual switch may transmit the encapsulated packet with the global multicast IP address a destination address in the packet's header.

Method 600 may be better explained by reference to information handling system 400 of FIG. 4. For example, VM 104A on host 102 sends a multicast packet to virtual switch 106 (step 602). The packet contains a customer-specific multicast IP address, which is a multicast IP address that is unique within the customer's environment.

Virtual switch 106 receives the packet and looks at its header for source and destination information (step 604). The virtual switch recognizes the customer-specific multicast IP address and uses it to determine a global multicast IP address. This determination may also be based on the VLAN or tenant from which the packet is received. Virtual switch 106 may use an address mapping to map the customer-specific multicast IP address to the global multicast IP address. The global multicast IP address may be understood by the physical network, while the customer-specific multicast IP address may have meaning limited to the virtual switches that are in communication with VMs that have been allocated to the customer. Virtual switch 106 then encapsulates the packet with the global multicast IP address in a header (step 606). The global multicast IP address may be associated with a tenant ID, such as tenant ID 402, which may also be inserted into the packet's header by virtual switch 106. After encapsulation, virtual switch 106 sends the encapsulated packet through the physical network beginning with switch 204 (step 608).

From there, the path of the encapsulated packet is determined by the global multicast IP address included in the header. In the example provided in FIG. 4, the packet is transmitted to the NVE functionality provided, in this example, by virtual switches 116 and 126 for decapsulation. Virtual switches 116 and 126 receive the packets and distribute them according to membership in the multicast group designated by the global multicast IP address, and tenant ID 402, which they use to map to the associated customer-specific multicast IP addresses used within each host having member VMs. If when the packet arrives at virtual switch 106 from VM 104A, virtual switch 106 does not recognize the customer-specific multicast IP address and thus cannot map the customer-specific multicast IP address to a global multicast IP address, virtual switch 106 may request a global multicast IP address from the network orchestrator. Additionally, virtual switch 106 may recognize that either one or both of VMs 104B and 104C are member VMs associated with the customer-specific multicast IP address. In such cases, virtual switch 106 may also transmit the packet to member VMs that are on host 102 and managed by hypervisor 103.

Figure 7:
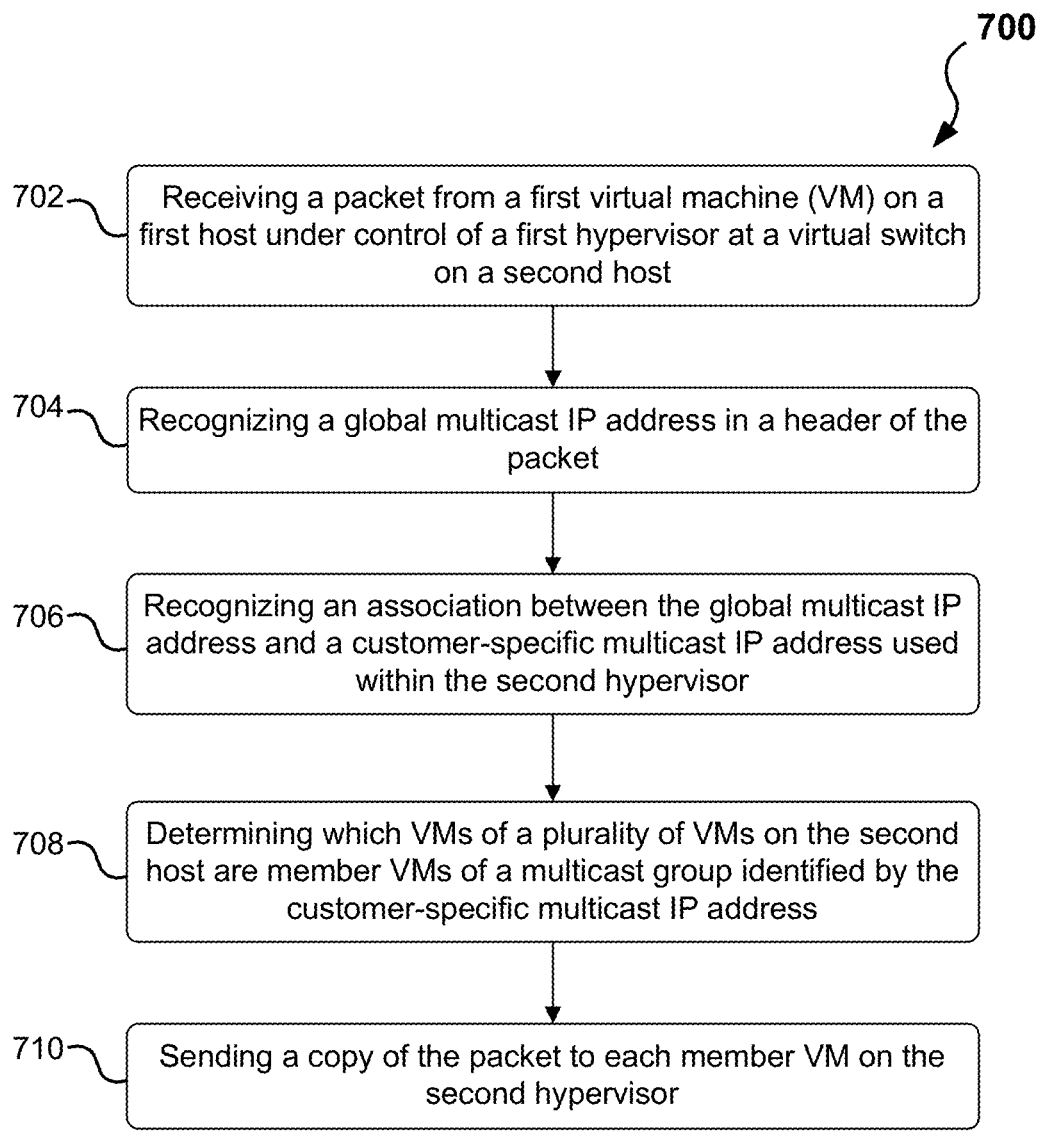
FIG. 7 is a flowchart of a method for allowing multicast addressing in an overlay network.

FIG. 7 is a flowchart of a method 700 for allowing multicast addressing in an overlay network, such as depicted in information handling system 200 in FIG. 2 or information handling system 300 or 400. Method 700 may begin in step 702 when a virtual switch running on a second host receives a packet from a first VM on a first host running a first hypervisor. In step 704, the virtual switch may recognize a global multicast IP address in the packet's header. The virtual switch may recognize that the global multicast IP address, which is the IP address of a multicast group in a physical network, is associated with a customer-specific multicast IP address used on the second host running a second hypervisor, in step 706. The second hypervisor may manage a plurality of VMs, and the virtual switch may determine which VMs of the plurality of VMs on the second host are member VMs of a multicast group identified by and/or associated with the customer-specific multicast IP address, in step 708. In step 710, the virtual switch may send a copy of the packet to each member VM on the second host.

Information handling system 400 as seen in FIG. 4 may provide an example to better illustrate method 700. As operating in information handling system 400, an example of method 700 begins when virtual switch 116 on host 112 receives a packet from VM 104A on host 102 through an IP tunnel identified by tenant ID 402 (step 702) and a global multicast IP address. Virtual switch 116 recognizes a global multicast IP address in the packet's header (step 704). The global multicast IP address is associated with the tunnel represented by tenant ID 402 in FIG. 4. This tunnel is a multicast tunnel.

Method 700 continues when virtual switch 116 maps the global multicast IP address in the packet's header to a customer-specific multicast IP address, which is used for a multicast group (step 706) that exists for every tenant (with associated VMs) allocated to a single customer. Virtual switch 116 determines, based on previously received IGMP join requests sent by VMs running on host 112, that VMs 114A and 114C are member VMs, members of the multicast group designated by the customer multicast IP address. VM 114A is part of tenant 250, and VM 114C is part of tenant 252. After determining which VMs on host 112 are member VMs, virtual switch 116 sends copies of the packet to VM 114A and also to 114C. In embodiments in which the packet is a tagged packet, the NVE or virtual switch 116 may add or modify the tag in the inner Ethernet header of the packet.

In order to be member VMs, VMs 114A and 114C may request to join the multicast group. Virtual switch 116 may receive the request from VM 114A to join the multicast group, and may send a request to join the group corresponding to the global multicast IP address in the physical network (including switches 204, 214, and 224 and aggregation devices 220). The global multicast IP address may be provided by request from a network orchestrator so that the global multicast IP address is a unique IP address within the physical network of the data center. The requests to join may be IGMP join requests.

Some embodiments of information handling systems as disclosed herein include non-transient, tangible, machine-readable media that includes executable code that when run by a processor, such as a computer processor of on one of hosts 102, 112, or 122 or switches 204, 214, or 224, may cause the processor to perform the steps of method 600 or 700 as described above. Some common forms of machine-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. The machine-readable media may be memory on one of hosts 102, 112, or 122 or switches 204, 214, or 224.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system comprising:
a first hypervisor running on a first host, the first hypervisor managing a first virtual switch also running on the first host;
a second hypervisor running on a second host, the second hypervisor managing a second virtual switch also running on the second host; and
a plurality of virtual machines (VMs), including a first VM running on the first host under control of the first hypervisor, the first VM being part of a first tenant, and a second VM running on the second host under control of the second hypervisor, the second VM being part of a second tenant; and
wherein the first virtual switch has a mapping in memory that maps a customer-specific multicast IP address, used by the plurality of VMs to indicate a multicast group, to a global multicast IP address used by the first and second hosts, wherein the multicast group includes VMs in the first and the second tenants.

2. The information handling system of claim 1, further comprising:
a third hypervisor running on a third host, the third hypervisor managing a third virtual switch; and
a third VM running on the third host under control of the third hypervisor and in communication with the third virtual switch, the third VM being part of the second tenant;
wherein the third virtual switch has a mapping in memory that maps the customer-specific multicast IP address to the global multicast IP address used by the first and second hosts.

3. The information handling system of claim 2, wherein the third VM is part of a third tenant, and wherein the multicast group includes VMs in the first, second, and third tenants.

4. The information handling system of claim 1, wherein the first virtual switch is configured to:
identify the customer-specific multicast IP address in a packet sent from a VM running on the first host under control of the first hypervisor;
use the mapping to retrieve the global multicast IP address using the customer-specific multicast IP address; and
encapsulate the packet with the global multicast IP address.

5. The information handling system of claim 1, wherein the mapping in memory maps the customer-specific multicast IP address to the global multicast IP address and a multicast tenant group identifier, the multicast tenant group identifier being an identifier used for multicast traffic sent within portions of a physical network allocated to a customer, the portions including the first and second hosts.

6. The information handling system of claim 5, wherein the global multicast IP address is unique within the physical network.

7. The information handling system of claim 1, wherein each of the first and second tenants further comprise a plurality of VMs running on a plurality of hosts.

8. The method of claim 1, wherein the global multicast IP address is associated with a tenant identifier.

9. A method for providing multicast addressing in an overlay network, the method comprising:
 sending a packet from a first virtual machine (VM) of a plurality of VMs on a host;
 receiving the packet at a virtual switch on the host in communication with the first VM, the packet including a customer-specific multicast IP address of a multicast group used by a customer of a data center, the multicast group including at least one VM in a first tenant and at least one VM in a second tenant;
 encapsulating the packet with a global multicast IP address of the multicast group, the global multicast IP address being a unique multicast IP address within a physical network; and
 transmitting the encapsulated packet with the global multicast IP address as a destination address.

10. The method of claim 9, wherein the customer-specific multicast IP address is an IP address used by the plurality of VMs on a plurality of hosts.

11. The method of claim 9, further comprising using a mapping of the customer-specific multicast IP address to the global multicast IP address to determine the global multicast IP address from the customer-specific multicast IP address.

12. The method of claim 9, wherein transmitting the encapsulated packet to the global multicast IP address comprises transmitting the encapsulated packet through the physical network to another plurality of VMs on additional hosts, wherein the another plurality of VMs are associated with the multicast group identified by the global multicast IP address.

13. The method of claim 9, further comprising requesting a global multicast IP address if the virtual switch does not recognize the customer-specific multicast IP address.

14. The method of claim 9, further comprising sending an Internet Group Management Protocol (IGMP) join request to join the multicast group corresponding to the global multicast IP address.

15. The method of claim 9, further comprising:
 recognizing a number of the plurality of VMs that are associated with the global multicast IP address; and
 transmitting the packet from the virtual switch to the number of the plurality of VMs without encapsulating the packet.

16. A method for providing multicast addressing in an overlay network, the method comprising:
 receiving a packet from a first virtual machine (VM) on a first host under control of a first hypervisor at a virtual switch on a second host under control of a second hypervisor;
 recognizing a global multicast IP address in a header of the packet;
 recognizing an association between the global multicast IP address and a customer-specific multicast IP address used within the second host;
 determining which VMs of a plurality of VMs on the second host are member VMs of a multicast group identified by the customer-specific multicast IP address, the multicast group including at least one VM in a first tenant and at least one VM in a second tenant; and
 sending a copy of the packet to each member VM on the second host.

17. The method of claim 16, further comprising:
 receiving a request at the virtual switch from a first VM of the plurality of VMs to join the multicast group as identified by the customer-specific multicast IP address; and
 sending a request from the virtual switch to join the multicast group as identified by the global multicast IP address in a physical network.

18. The method of claim 17, wherein the requests to join are Internet Group Management Protocol (IGMP) join requests.

19. The method of claim 17, wherein some of the member VMs are part of the first tenant and others of the member VMs are part of the second tenant.

20. The method of claim 19, wherein the first VM is part of a third tenant, and VMs on the first, second, and third tenants are part of the multicast group as identified by the customer-specific multicast IP address.

* * * * *